United States Patent [19]

Usry

[11] 4,146,112

[45] Mar. 27, 1979

[54] SOUND REDUCING BAFFLE FOR ELECTRICAL APPARATUS

[75] Inventor: Gerald O. Usry, Rome, Ga.

[73] Assignee: General Electric Company

[21] Appl. No.: 847,067

[22] Filed: Oct. 31, 1977

[51] Int. Cl.² ........................................ H02K 5/24

[52] U.S. Cl. ........................................ 181/202; 181/264; 336/59; 336/100; 181/256; 181/281

[58] Field of Search ............... 181/204, 224, 200, 201, 181/202, 203, 205, 230, 242; 336/59, 100

[56] References Cited

U.S. PATENT DOCUMENTS

| | | | |
|---|---|---|---|
| 3,451,503 | 6/1969 | Twomey | 181/202 |
| 3,530,840 | 9/1970 | Freyn | 181/204 |
| 3,762,489 | 10/1973 | Proksch et al. | 181/204 |

*Primary Examiner*—L. T. Hix
*Assistant Examiner*—Benjamin R. Fuller
*Attorney, Agent, or Firm*—Francis X. Doyle; Richard A. Menelly

[57] ABSTRACT

A sound reducing baffle for air cooled electrical apparatus with a ventilated enclosure comprised of a box-like closure member positioned in front of the ventilating openings and open at the back and top thereof to permit the transfer of air.

The sound is attenuated by reflections and absorption within the baffle with little or no interference with the transfer of cooling air to and from the enclosure.

4 Claims, 13 Drawing Figures

SOUND REDUCING BAFFLE FOR ELECTRICAL APPARATUS

BACKGROUND OF THE INVENTION

This invention relates to sound reducing baffles for use with air-cooled induction apparatus such as an electrical transformer. The use of power transformers operating in the kilovolt range inside residential and commercial buildings may present a noise problem.

In ventilated dry type transformers, the transformer assembly is cooled by natural convection currents or by forced air cooling. Ventilating openings are provided near the top and bottom of the enclosures in order to permit the free passage of air to the transformer during the cooling process. In order to reduce the amount of noise radiated from the transformer enclosure, the inner walls of the enclosure are frequently lined with a sound absorbing material. Since the housing is essentially sealed except for the ventilating openings, and since it has been heretofore impossible to baffle the sound emanating through the ventilating openings without interfering with the flow of air necessary to cool the transformer, they are the main sound transmission path.

One method for attempting to reduce the sound generated within an air ventilated dry type transformer is described in U.S. Pat. No. 3,451,503. This method provides a Helmholtz resonator mounted within the transformer enclosure proximate each of the ventilating openings. The sound, in passing through the ventilating openings, becomes attenuated to some degree since the resonator cavities are tuned to the frequency of the generated sound. Each of the Helmholtz resonators is mounted adjacent each ventilating opening and particular care is taken not to restrict the ventilating opening.

The increasing use of power transformers in residential localities anticipates a further reduction in the amount of noise emanating from the transformer enclosure. The transformers can generate sound in excess of 60 dBA and it has been determined that sound levels in excess of 45 dBA can be uncomfortable, especially in the evening. The purpose of this invention therefore is to provide sound attenuating apparatus for use with dry type, air cooled electrical apparatus to effectively reduce the level of the transformer generated sound with little or no interference with the transformer cooling process.

SUMMARY OF THE INVENTION

The invention comprises a sound reducing baffle for air cooled electrical apparatus and consists of a baffle mounted either internal, external, or both internally and externally to the electrical apparatus enclosure. The baffles are specifically designed to attenuate sound by the mechanism of intensity loss by reflection by providing a sound barrier in the path of the incoming and outgoing air flow with little or no interference with the rate of flow.

One embodiment comprises an L-shaped extended member attached to the apparatus enclosure and extending outwardly in the vicinity of the ventilating opening. The large leg of the L faces downward for the bottom ventilating openings and the large leg of the L is mounted upwardly for the upper ventilating openings to promote the flow of air from the bottom to the top of the electrical apparatus enclosure.

A further embodiment of the sound reducing baffle of this invention includes a layer of sound absorbing material on the surface of the baffle facing the enclosure in order to absorb the sound upon reflection.

DESCRIPTION OF THE PREFERRED EMBODIMENT

Figure 1:
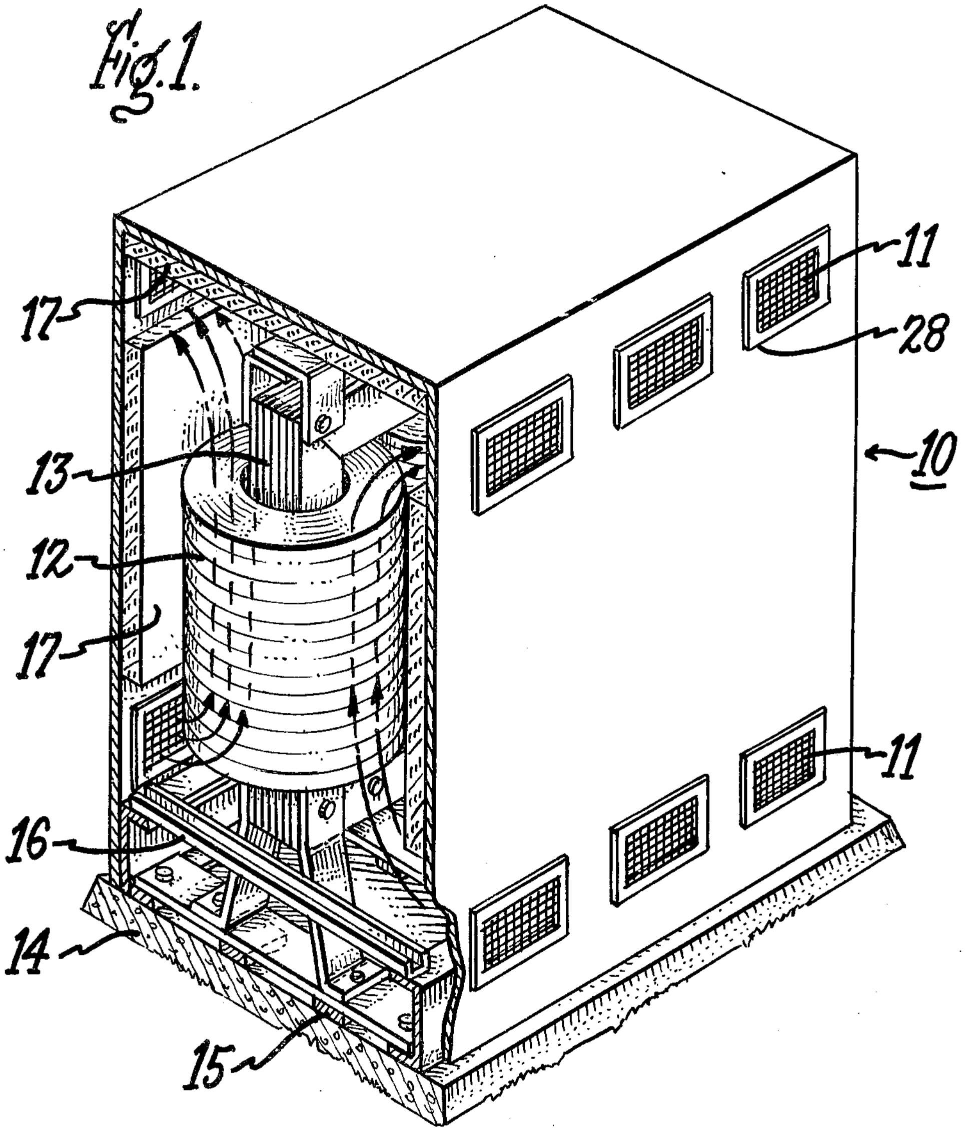
FIG. 1 is a side perspective view of a transformer enclosure assembly for use with the sound reducing baffle of this invention.

The sound reducing baffle of this invention is described for use with air cooled electrical apparatus of the type shown in FIG. 1. A metallic housing 10 encloses a transformer 12 of the type having a yoke 13 attached to a rigid base 14 by means of vibration damping pads 15. A plurality of structural cross members 16 are usually employed to provide further support to the housing 10. A plurality of ventilating openings 11 are provided at the top and bottom of the housing 10 to promote the free flow of air to within the interior of the housing 10. In order to attenuate the sound emanating from the transformer 12, insulation material 17 usually of a glass fiber type is sometimes applied to the interior surface of the housing 10. Sound waves generated by the transformer 12 upon reaching the insulation material 17 lose intensity by means of absorption within the insulation material 17 and upon reflection from the surface. Since the top, bottom and sides of the housing 10 are sealed, the principle egress for the sound generated by transformer 12 is by means of ventilation openings 11.

Figure 2:
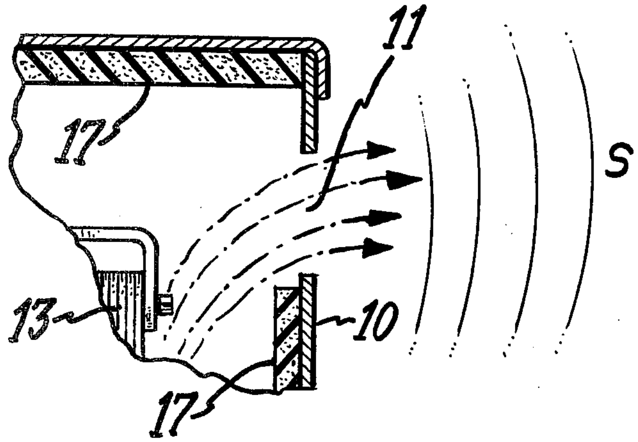
FIG. 2 is a side sectional view of the assembly of FIG. 1 including air flow directional arrows.
Figure 3:
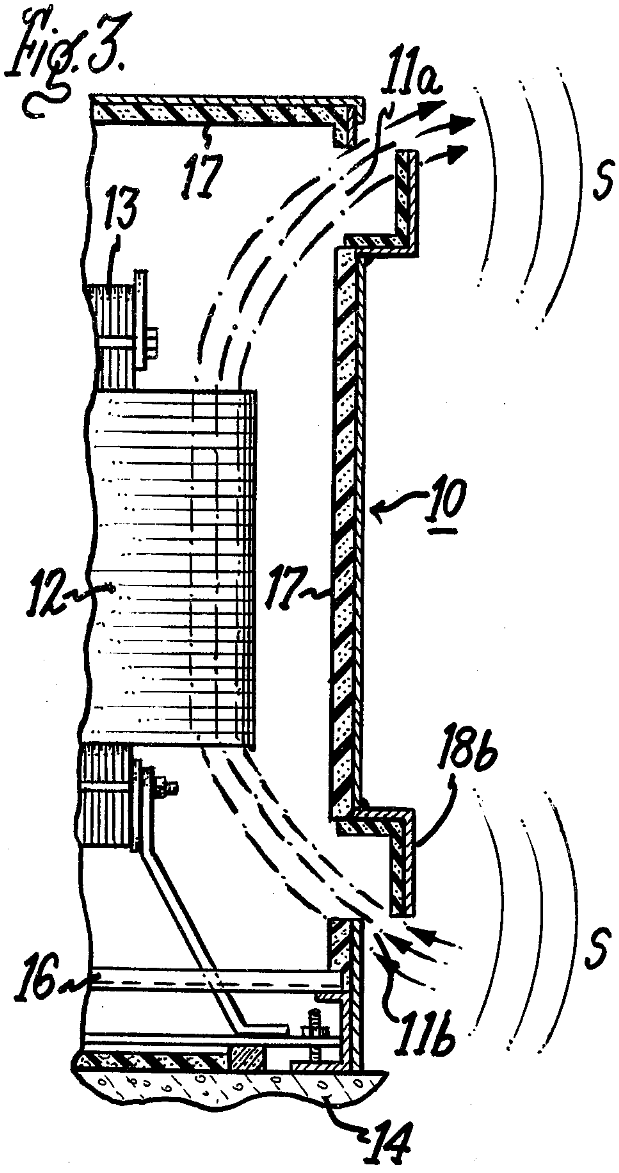
FIG. 3 is a side perspective view of the apparatus of FIG. 1 with a pair of sound baffles attached according to the invention.

The ventilating means for cooling the transformer 12 of FIG. 2 is shown in FIG. 3. The convection air currents indicated by the directional arrows move from the bottom ventilation opening hereinafter designated as 11B to the top ventilation opening hereinafter designated as 11A. The density of the ambient air at the bottom of the housing 10 is generally greater than the density of the ambient air near the top of the exterior of the housing 10 and enters into the bottom ventilator opening 11B, contacts the bottom section 12 and becomes heated upon contact therewith and decreases in density rapidly rising to the top of the housing 10 until being forced out through top ventilator opening 11A. Since the sound generated by the transformer 12 exits readily through each of the ventilation openings 11A, 11B, as indicated by the radially emanating waves S this invention proposes to substantially decrease the emanated sound waves S with little or no interference with the rate of heat transfer away from the transformer 12 as indicated by the air passage through openings 11*a*, 11*b*.

Figure 3A:
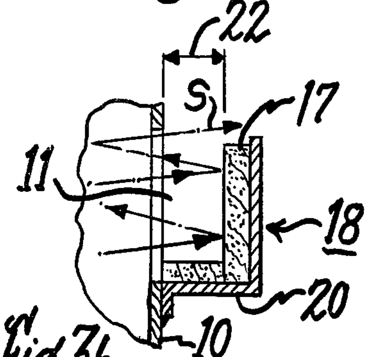
FIGS. 3A to 3E are side sectional views of different embodiments of the sound reducing baffle of this invention.

FIG. 3 shows a housing 10 including a transformer 12. The top mounted baffle 18*a* of this invention is shown mounted at top of the housing 10 proximate the top ventilating opening 11*a*. The top baffle 18*a* is fastened to the housing by means of a fastening member 24 fixedly attached to the baffle 18*a* for removably mounting on housing 10. The baffle 18*a* can be fixedly attached to the housing 10 by means of welding, but it is preferred to mount the baffle 18*a* by some removable means such as for example self tapping screws. This allows ready access to the plurality of top openings 11*a* for cleaning and repair. The baffles 18*a*, 18*b*, can also be integrally formed in whole or in part from the material of the housing 10. The front section 19 (FIG. 5) of the top baffle 18*a* is spaced a fixed distance from the housing by means of a plurality of baffle spacers 23. The top baffle 18*a* is mounted relative to the housing 10 such that the top baffle opening described as 22*a* is approximately equal to the total cross sectional area defined by each of the openings 11*a*. This is necessary to promote good sound baffling properties with little or no interference with the transmission of air through the openings 11*a*. The top baffle 18*a* is closed by a side member 21 at both sides thereof and by a bottom member 20 so that the only means for egress through the opening 11*a* is by means of top baffle opening 22*a*. A bottom baffle member 18*b* is mounted at the bottom of the housing 10 (FIG. 4) similar to that described earlier for top baffle 18*a* except that the bottom baffle opening 22*b* faces downward. The upward direction of top baffle opening 22*a* and the downward pointing direction of bottom baffle opening 22*b* is to ensure the flow of air from the bottom of housing 10 through bottom baffle 18*b* to within the housing 10 and out through the top baffle 18*a* in the manner as described earlier for the embodiment of FIG. 2. Both top and bottom baffles 18*a*, 18*b*, are made of sheet metal or plastic and can be formed from a single piece for convenience in construction. Various configurations for both top and bottom baffles 18*a*, 18*b* are shown in FIGS. 3A to 3E. The baffles within the embodiments of FIGS. 3A to 3E will be hereafter described by reference number 18 since the embodiments are equally applicable to top and bottom mounted devices. The embodiment of FIG. 3A is mounted with the front 19 forward of the ventilation opening 11 and includes a layer of insulation material 17 to promote the absorption of sound. The sound directional arrows S show that the sound is reflected and partially absorbed upon the surface of the sound absorbing 17 as described earlier for the embodiments of FIGS. 1 and 2. The embodiment of FIG. 3A therefore provides for the effective total coverage of the interior of the housing 10 with sound absorbing material 17.

Figure 3B:
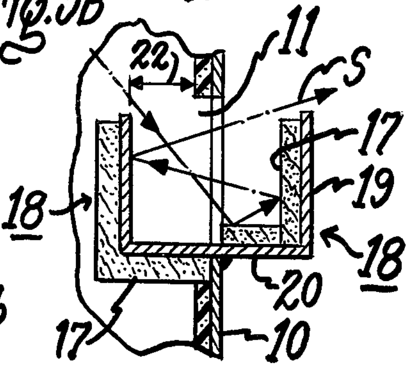

FIG. 3B is similar to the embodiment of FIG. 3A and includes an interiorly mounted front section 19. The interior mounted front section 19 also has a layer of sound absorbing material 17 to further promote the attenuation of sound originating interior to the housing 10. The baffle openings 22 for all the embodiments of this invention are calculated to be equal to or greater in total surface area than the combined available cross sectional area of all the ventilating openings 11 in order to ensure that the transfer of air through the ventilating openings 11 is not hindered.

Figure 3C:
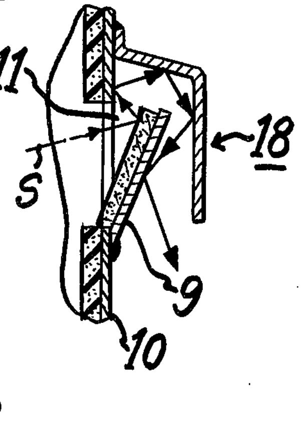

FIG. 3C shows an embodiment 18 for greater attenuation for natural and forced ventilation where a fan is mounted within housing 10 to promote the transfer of air through the openings 11, the deflector 9 can be employed without seriously interfering with the forced air flow properties. The deflector 9 can include sound absorbing material 17 and be mounted to the housing 10 in a manner described earlier for the embodiments of FIGS. 3A and 3B. The purpose of the deflector 9 is to force the sound wave S into a plurality of multiple internal reflections as indicated, thus reducing the emanating sound level.

Figure 3D:
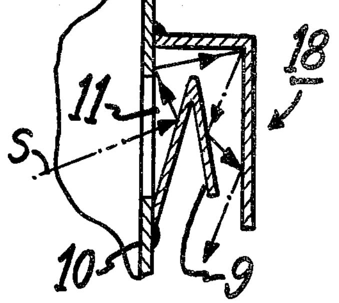

FIG. 3D is a further embodiment of the device of FIG. 3C. The baffle 18 is mounted to the housing 10 relative to the ventilating opening 11 in a manner similar to that described earlier for FIG. 3C and V-shaped deflector 9 is incorporated within the baffle 18 in order to provide a plurality of reflecting surfaces for the sound wave S. It should be noted that the decrease in sound level depends on the number of reflections that the sound wave S makes before leaving the housing 10. It should be further noted that the presence of a sound absorbing material 17 greatly increases the loss in sound upon reflection since part of the sound is absorbed. The invention further provides a tortuous path for the sound waves originating within the housing 10 such that the sound wave must necessarily contact and become reflected off the interior surface of the baffle 18 before leaving the housing 10.

Figure 3E:
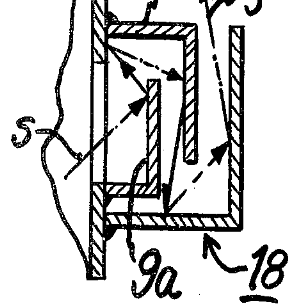

FIG. 3E provides a pair of deflectors 9*a*, 9*b* for further providing a tortuous path to sound emanating from opening 11. The deflectors 9*a*, 9*b* are mounted external to the housing 10 within baffle 18.

Figure 4:
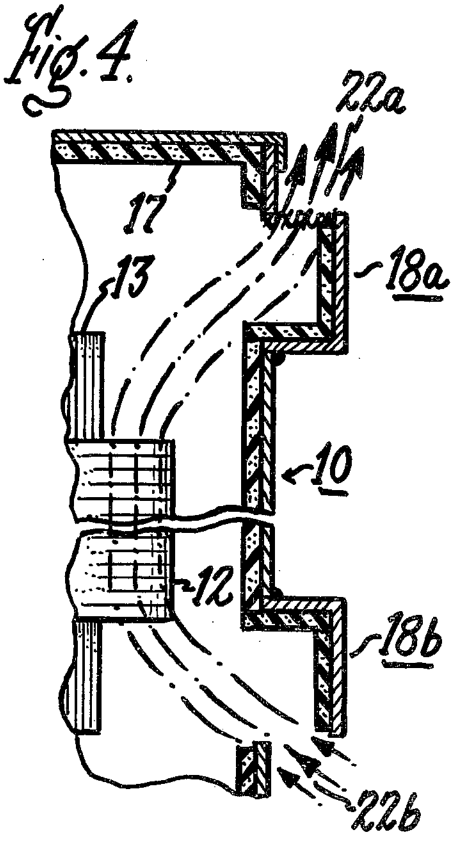
FIG. 4 is a side sectional view of the apparatus of FIG. 3 including air flow directional arrows.

The air flow characteristics for the top and bottom mounted baffles 18*a* and 18*b*, of FIG. 3 is shown in detail in FIG. 4. Two top baffles 18*a* and two bottom baffles 18*b* are mounted on the housing 10 but only one of each top and bottom baffle will be described. It is to be noted that a single top mounted baffle 18*a* extends along the surface of the housing 10 to encompass a plurality of ventilating opening 11*a* and a single bottom baffle 18*b* extends along and operatively encompasses a plurality of bottom ventilating opening 11*b* providing that the top and bottom baffle openings 22*a*, 22*b* exceed or equal the total cross sectional area provided by the plurality of top and bottom ventilating openings 11*a*, 11*b*. The circulating air is indicated by arrows in a manner similar to that described earlier for the housing 10 of FIG. 2 wherein the denser ambient air enters the bottom baffle 18*b* by means of the bottom baffle opening 22*b* and is carried by convection up through and across the surface of transformer 12 wherein the air continuously becomes less dense upon heating, and is forced by incoming air out through the top baffle 18*a* through the top baffle opening 22*a*. As shown in FIG. 4 sound emanating from within housing 10 will reflect off the insulating material 17 shown by the individual wave S and will be substantially decreased in magnitude as well as being redirected out through the top baffle opening 22*a* in the direction indicated by the wave train S. The downwardly directed bottom baffle opening 22*b* promotes air flow in the pattern indicated and the upwardly directed top baffle opening 22*a* promotes the transfer of air in the direction of natural convection currents for the reasons described earlier.

Figure 5:
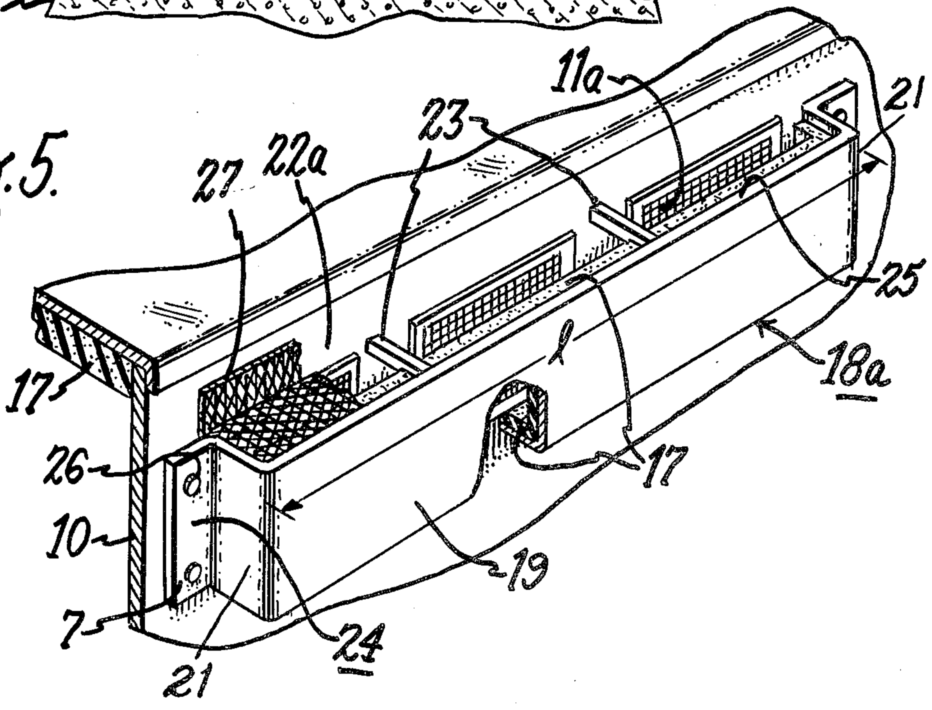
FIG. 5 is a top perspective view of the sound reducing baffle of the invention.

An enlarged view of the top baffle 18*a* of FIG. 4 is shown in FIG. 5. For a transformer having three top and bottom ventilation openings on both sides of the transformer housing the ventilation opening dimensions are approximately 10 × 18 inches for each opening. The front 19 of the baffle 18a measures approximately 11", and the side 21 and bottom 20 extend approximately 3". The thickness 25 can be roughly ½" depending upon the total length of the baffle 18. For the embodiment of FIG. 5 the length l is approximately 6 ft. and the spacers 23 are each approximately 3" long. The thickness of the insulation material 17 varies depending upon the composition of material used and the overall intensity of sound generated by the transformer. The fastener 24 can consist of a flat plate 7 having a plurality of holes 26 for bolting the baffle 18a to the transformer housing 10. A screen material is generally provided over the ventilation openings 11 or a plurality of perforations are embossed into the housing 10 having the dimensions as described earlier. For the baffle 18a of the invention, the embossed perforations and/or the screen material can be omitted, and the ventilating openings 11 can be cut directly from the housing 10 in order to provide better air transmission and a screen 27 can be provided to the baffle opening 22a to perform the same function and purpose of the screen and/or perforations as applied to the housing 10. The baffle 18a as shown in FIG. 5 can be applied to an already installed housing 10 as described generally in FIG. 1 in response to a customer's complaint that the existing noise levels emanating from the housing 10 are uncomfortable. A plurality of baffles 18a can be installed in the field by simply drilling into the housing structure and fastening the baffle 18a by means of the holes provided as indicated at 26. The sound attenuating baffles of this invention can also be welded in the field or during the fabrication of the housing as described earlier.

Figure 6:
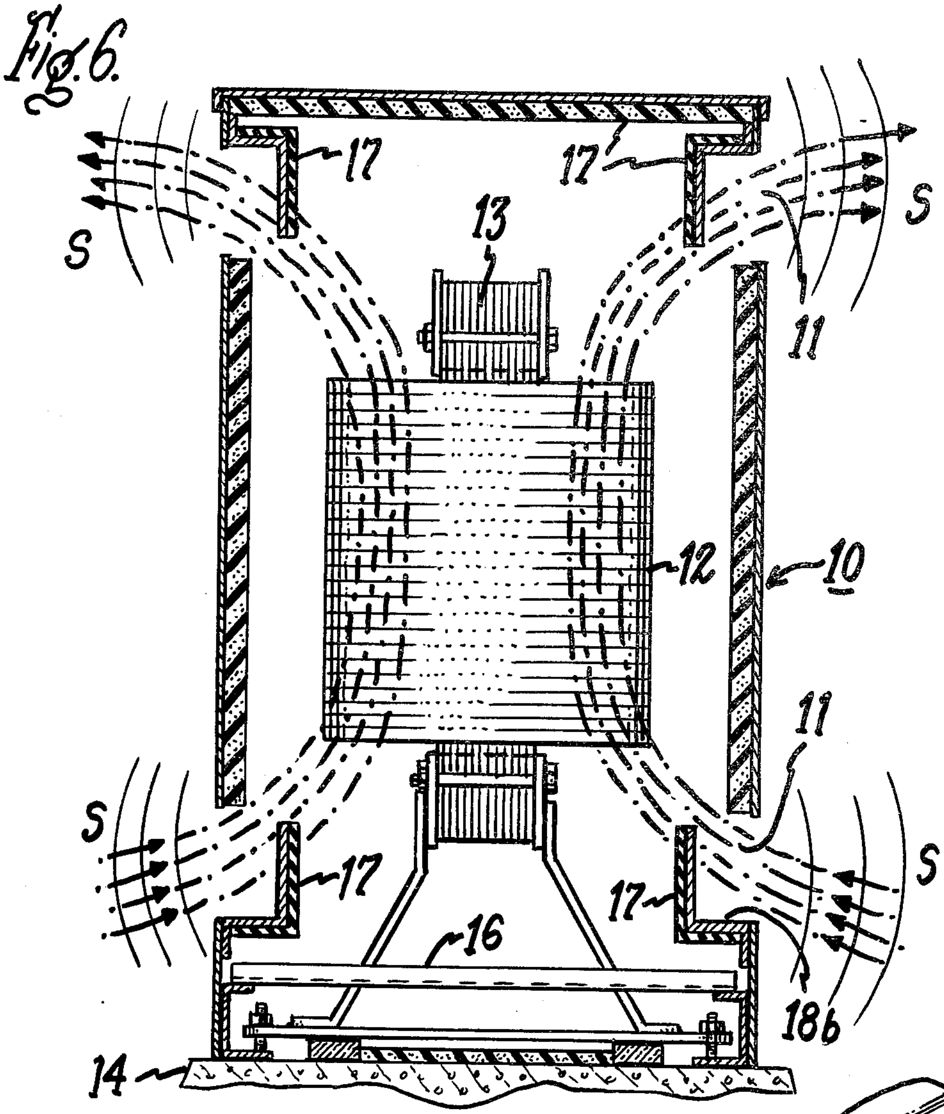
FIG. 6 is a side sectional view of the enclosure of FIG. 3 with the inventive sound reducing baffles mounted on the interior of the enclosure.

FIG. 6 shows an embodiment of the sound attenuating baffle 18 of this invention mounted on the interior surface of housing 10. In this embodiment the top baffle 18a is mounted with top baffle opening 22a facing downward and with insulation layer 17 interior to the housing 10. The bottom baffle 18b is mounted with the bottom baffle opening 22b facing upward which is directly opposite to the external mounted top and bottom baffles 18a and 18b for the embodiment of FIG. 2. This embodiment provides for nearly complete coverage of the interior of the housing 10 with insulating material 17 and is a very effective method for mounting the sound attenuating baffles 18 of this invention during the transformer manufacturing process. The internally mounted top and bottom baffles 18a, 18b can be mounted in the field in the manner described earlier for the embodiment of FIGS. 4 and 5 but it is more convenient to mount the baffles 18 when mounting the transformer 12 within the housing 10.

Figure 7:
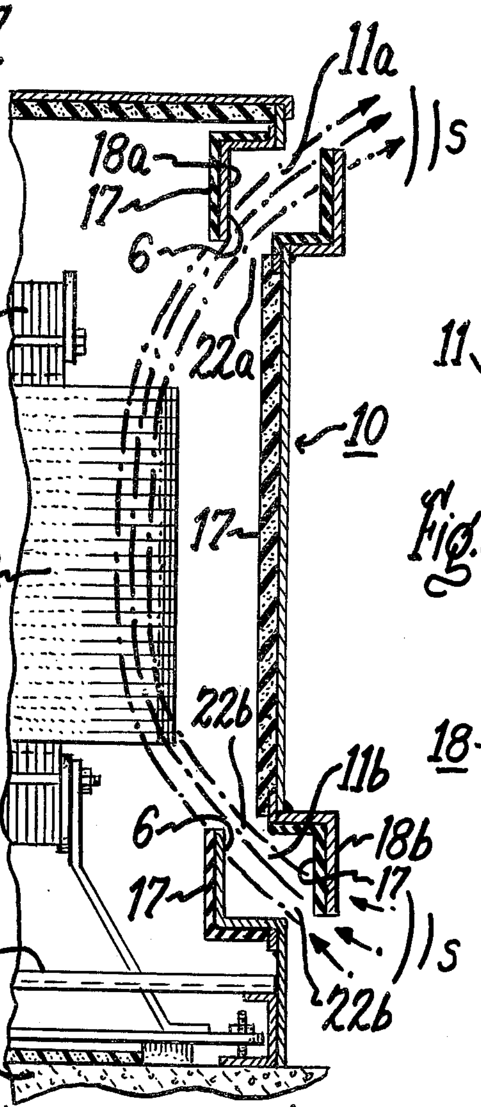
FIG. 7 is a side sectional view of the enclosure of FIG. 3 with inventive sound reducing baffles mounted interior and exterior to the enclosure.

An extremely efficient application for the sound attenuating baffles of this invention can be seen by referring to FIG. 7. Here a pair of top baffle members 18a are mounted at the top of the housing 10 and a pair of bottom baffles 18b are mounted at the bottom thereof. As shown by the air direction arrows, the flow of air into the housing 10 is not seriously interfered with whereas the transfer of sound is seriously impeded by the tortuous path presented by the top and bottom baffle pairs 18a, 18b. It is to be noted that the bottom baffle openings 22b for the pair of internal and external mounted bottom baffles 18b are equal to or greater than the cross sectional area of the bottom ventilating openings 11b and the top baffle openings 22a for the pair of top baffles 18a is greater than or equal to the top ventilating openings 11a for the reasons described earlier. The presence of the insulation layer 17 on both the internal and external mounted top and bottom baffles 18a, 18b, greatly reduces the amount of sound emanating from the housing 10 and the sound level can be further decreased if an additional insulation layer 17 is placed on the outwardly facing surface 6 of the internally mounted top and bottom baffles 18a, 18b.

Figure 8:
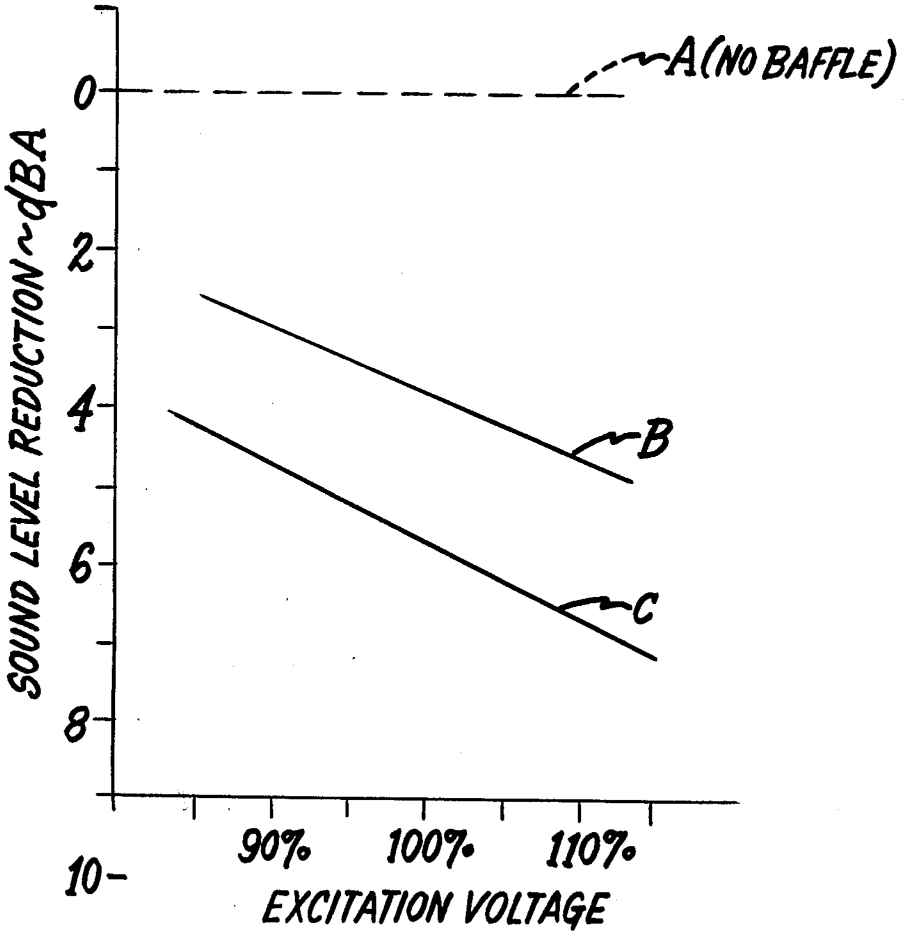
FIG. 8 is a graphic representation of the sound level reduction as a function of electrical excitation voltage for the sound reducing baffle of this invention.

The measured sound level reduction values in dBA units for the transformer 12 shown in all the embodiments of this invention is shown graphically in FIG. 8. The zero sound reduction level indicated by the dotted line A is for the embodiment of FIG. 1 which contains a transformer 12 mounted within a standard housing 10 with no baffle means provided. Curve B indicates the sound reduction for the embodiment of FIG. 3 with top and bottom baffles 18a, 18b with no insulation 17 provided on the baffles. Curve C indicates the sound level reduction for the same embodiment of FIG. 3 with a layer of sound absorbing material 17 mounted on the inner surface. The sound reduction values for B and C are plotted as functions of the excitation voltage applied to the transformer 12.

The sound level reduction measurements for the embodiment of FIGS. 6 and 7 have not as yet been determined but calculations indicate that sound level reductions as great as 10 dBA can be achieved with the embodiment of FIG. 7 and slightly less than 10 dBA can be achieved with the embodiment of FIG. 6.

Although the sound attenuating baffle of this invention is described for enclosures containing air cooled power transformers, this is by way of example only. The sound attenuating baffles of this invention readily provide sound attenuation to any enclosure containing electrical apparatus requiring ventilation means for cooling and/or access to the apparatus enclosed.

I claim:

1. A sound reducing enclosure for convection cooled transformers comprising:

A transformer housing closed at the top, bottom and sides and containing a plurality of ventilating openings at the top and bottom for the passage of air;

A pair of top and bottom baffles each having a pair of opposing side members, a front member extending between the side members and a bottom member coextensive with the side members to form an L-shaped structure said top baffle being mounted at a top exterior portion of the housing coextensive with the top ventilating openings and positioned vertically upward external to the housing for exiting ventilating air from the housing, said bottom baffle being mounted at a bottom exterior portion of the housing coextensive with the bottom ventilating openings and with the front member positioned vertically downward for receiving ventilating air to the housing.

2. The enclosure of claim 1 further including at least one spacing member extending between the front member and the housing for maintaining a predetermined distance between the side members and the housing.

3. The enclosure of claim 1 further including a layer of sound absorbing material on the inner surface of the structure for promoting the attenuation of sound within the structure.

4. A sound reducing enclosure for convection cooled transformers comprising:

A transformer housing closed at the top, bottom and sides and containing a plurality of ventilating openings at the top and bottom for the passage of air:

A pair of top and bottom baffles each having a pair of opposing side members, a front member extending between the side members and a bottom member coextensive with the side members to form an L-shaped structure said top baffle being mounted at a top interior portion of the housing coextensive with the top ventilating openings and with the front member positioned vertically downward internal to the housing for exiting ventilating air from the housing, said bottom baffle being mounted at a bottom interior portion of the housing coextensive with the bottom ventilating openings and with the front member positioned vertically upward for receiving ventilating air to the housing.

* * * * *